(12) United States Patent
Relin

(10) Patent No.: US 9,206,694 B2
(45) Date of Patent: Dec. 8, 2015

(54) METHOD OF DYNAMIC ENERGY-SAVING SUPERCONDUCTIVE PROPELLER INTERACTION WITH A FLUID MEDIUM

(71) Applicant: REMCO International, Inc., Huntingdon Valley, PA (US)

(72) Inventor: Arkadi Relin, Langhorne, PA (US)

(73) Assignee: REMCO International, Inc., Huntingdon Valley, PA (US)

( * ) Notice: Subject to any disclaimer, the term of this patent is extended or adjusted under 35 U.S.C. 154(b) by 0 days.

(21) Appl. No.: 14/120,122

(22) Filed: Apr. 29, 2014

(65) Prior Publication Data

US 2015/0110623 A1   Apr. 23, 2015

Related U.S. Application Data

(62) Division of application No. 12/927,182, filed on Nov. 9, 2010, now abandoned.

(51) Int. Cl.

| | |
|---|---|
| *B64C 21/02* | (2006.01) |
| *F01D 5/14* | (2006.01) |
| *B63H 1/26* | (2006.01) |
| *B63H 1/28* | (2006.01) |
| *B64C 11/00* | (2006.01) |
| *F15D 1/00* | (2006.01) |
| *F01D 5/18* | (2006.01) |

(52) U.S. Cl.
CPC ................. *F01D 5/147* (2013.01); *B63H 1/26* (2013.01); *B63H 1/28* (2013.01); *B64C 11/00* (2013.01); *B64C 21/025* (2013.01); *F01D 5/18* (2013.01); *F15D 1/008* (2013.01); *Y02T 50/166* (2013.01)

(58) Field of Classification Search
CPC ...... B64C 21/00; B64C 21/02; B64C 21/025; B64C 21/04; B64C 21/06; B64C 21/08
USPC ........ 416/90 A, 93 R; 415/914; 251/205, 208
See application file for complete search history.

(56) References Cited

U.S. PATENT DOCUMENTS

| | | | |
|---|---|---|---|
| 7,354,247 B2 * | 4/2008 | Bonnet | 416/90 R |
| 7,387,491 B2 * | 6/2008 | Saddoughi et al. | 416/62 |
| 2003/0098144 A1 * | 5/2003 | Uselton et al. | 165/104.34 |
| 2007/0187549 A1 * | 8/2007 | Owen | 244/17.23 |

* cited by examiner

Primary Examiner — Nathaniel Wiehe
Assistant Examiner — Jeffrey A Brownson

(57) ABSTRACT

In a method of providing a dynamic energy-saving superconductive interaction of a rotating propeller with a fluid medium, an optimizer has a modulator modulating a value of a connection by the fluid medium flowing between perforations on working surfaces of a propeller blade through a shunt passage under an action of a difference of pressures generated on the working surfaces by providing a frequency, a range, a law and a phase of the modulating; and the optimizer optimizes a value of at least one parameter of the modulating in dependence on a change of a value of at least one controlled characteristic influencing energy efficiency of a work of an object interacting with the propeller system, thereby providing a dynamic energy optimization of the work of the object by optimization of modulated blowing/suction wave effects on a boundary layer adjacent to the working surfaces of the rotating propeller.

1 Claim, 7 Drawing Sheets

METHOD OF DYNAMIC ENERGY-SAVING SUPERCONDUCTIVE PROPELLER INTERACTION WITH A FLUID MEDIUM

TECHNICAL FIELD

The present invention relates to methods and devices for providing the processes of dynamic propeller interaction with a fluid medium in the propeller systems comprising at least one propeller having at least two blades having at least two working blade surfaces each. At the same time the fluid medium which interactions with the working blade surfaces of the propeller can be air (gas), water (liquid) or various blends. It encompasses a broad class of various propeller systems which are used, without any limitation, for example: in industry; in energy-related systems; in pipeline systems; in various ground, air, above water, underwater, and other types of mobile apparatuses; in medical and household technique; in converting and special technique; in research devices and systems; in physiological systems and in other areas. At the present time the broad class of such propeller systems under consideration represents one of the important developing areas are characterized with significant energy consumption.

This application is a division of patent application Ser. No. 12/927,182 filed Nov. 9, 2010, which is incorporated here by reference thereto and from which the instant application claims its priority under 37 CFR 119 (a)-(d).

BACKGROUND ART

Various methods and devices are known, which provide an improvement of an energy efficiency of the interaction of rotating propeller blades with a fluid medium in the different propeller systems. Common traditional methodological approaches, which are used in various propeller systems, are based on specific improvement of the various constructive and shape characteristics of the propeller blades; and also—on the use of the various specific materials for fabrication of the propeller blades and for coating of the working blade surfaces.

For the first time the proposed by author the functional classification of the traditional various propeller systems allowed to divide them in three basic groups.

The first group includes the energetically passive propeller systems not having a propeller drive and structurally connected with the working mechanisms. In such propeller systems the interaction of the passive rotating propeller blades with a turbulent medium flow (naturally or artificially created) is provided by a medium flow source, which structurally not connected with the energetically passive propeller system for example, without any limitation: in the different wind, gas or water propeller power generators (turbines); in different wind or water propeller mills, pumps or others working mechanisms; and also—in the different special working mechanisms with the energetically passive propeller system.

The second group includes the energetically active propeller systems comprising at least one propeller drive and structurally connected with a mobile apparatus to provide its movement for example, without any limitation: in the aircraft, helicopter, dirigible, boat, ship, tanker, submarine or mobile apparatus on so-called "air pillow"; and also—in the different underwater, air or ground special mobile apparatus. A process of a movement of such mobile apparatus provides under an energy action of a turbulent medium flow-draw which providing by the surface-energy interaction of the active rotating propeller blades with the fluid medium.

The third group includes the energetically active propeller systems comprising at least one propeller drive and structurally not connected with an object (for example, without any limitation: at least one solid body, fluid medium or blend), which energy interacting with a propeller turbulent medium flow for example, without any limitation: in the different flow action venting, cleaning, airing or refrigerating systems; in different flow action intermixing, concentrating, separating; and also—in the different object flow transporting, filtering or burning systems.

Common basic disadvantages of the known traditional methodological approaches providing an improvement of an energy efficiency of the interaction of rotating propeller blades with a fluid medium in such different propeller systems are as follows:

limited possibilities for dynamic reduction of energy consumption of the process of said interaction of rotating propeller blades with fluid medium, which comprises dynamic minimizing a boundary layer of the fluid medium on the working blade surfaces (for the above-listed three groups of the propeller systems);

impossibility of performing the dynamic optimization of the process of said interaction of rotating propeller blades with fluid medium in dependence on a change of a value of at least one controlled characteristic influencing the efficiency of the dynamic surface-energy interaction (for the above-listed three groups of the propeller systems);

impossibility of performing the dynamic optimization of the specific process of said interaction of passive propeller blades with fluid medium in dependence on a change of a value of at least one controlled characteristic influencing an energy efficiency of the working mechanism structurally connected with the energetically passive propeller system during the surface-energy interaction of the passive rotating propeller blades with a medium flow providing by a medium flow source, which structurally not connected with the propeller system (for the above-listed first group of the passive propeller systems);

impossibility of performing the dynamic optimization of the specific process of said interaction of active rotating propeller blades with fluid medium in dependence on a change of a value of at least one controlled characteristic influencing a dynamic energy efficiency of the process of said movement of the mobile apparatus structurally connected with the energetically active propeller system under an energy action of medium flow-draw, which is provided by the surface-energy interaction of the active rotating propeller blades with the fluid medium during said process (for the above-listed second group of the active rotating propeller systems);

impossibility of performing the dynamic optimization of the specific process of said interaction of active rotating propeller blades with fluid medium in dependence on a change of a value of at least one controlled characteristic influencing an energy efficiency of the process of medium flow transporting of said object structurally not connected with the energetically active propeller system under an energy action of medium flow, which is provided by the surface-energy interaction of the active rotating propeller blades with the fluid medium during said process (for the above-listed third group of the active rotating propeller systems);

impossibility of performing the complex dynamic surface-energy optimization of the above-explained general process of said interaction of rotating propeller blades with fluid medium in dependence on a change of a value of at least one controlled characteristic influencing the dynamic surface-energy interaction efficiency, which comprises dynamic minimizing a boundary layer of the fluid medium on the working blade surfaces, and energy optimization any from the above-explained specific processes (for the above-listed first, second or third group of the propeller systems), simultaneously.

The above-listed basic disadvantages significantly reduce energy, operational, and therefore also economical efficiency of application of all three groups of the traditional propeller systems. In addition said disadvantages significantly limit the possibilities during the solution of real problems connected with energy optimization of processes, which use the propeller systems.

At the same time using the methodological modulation approach, which was first proposed by Dr. A. Relin in 1990, open the qualitatively new possibilities during the solution of real problems connected with energy optimization of processes, which use said different propeller systems. Said modulation approach includes the negative modulation of a value of medium flow-forming energy action with the given modulation parameters and is based on the scientific researches of concepts of the new theory "Modulating aero- and hydrodynamics of processes of transporting objects with a flow of a carrying medium", as disclosed for example in U.S. Pat. No. 6,827,528 (2004); and U.S. Pat. No. 7,556,455 (2009)—A. Relin. This scientific concepts consider new laws which are connected with a significant reduction of a complex of various known components of energy losses (and therefore of specific consumption of energy) during creation of a dynamically controlled process of movement of the turbulent medium flow with a given dynamic periodically changing sign-alternating acceleration.

Therefore, using such new scientific concepts predestine the possibilities of practical development of the new modulation principles of formation of the propeller systems to realizing the new modulation method of dynamic energy-saving superconductive propeller interaction with a fluid medium.

SUMMARY OF THE INVENTION

Accordingly, it is an object of the present invention to provide the new modulation principles of formation of the propeller systems to realizing a new method of dynamic energy-saving superconductive propeller interaction with a fluid medium.

The proposed invention posits the goals connected with the solutions of series of the basis principle new scientific-practical problems to minimizing the above-listed basic disadvantages of and development the most energy-effective various (passive or active) propeller systems.

In keeping with these objects and with others, which will become apparent hereinafter, one of the new features of the present invention resides, briefly stated, in the new modulation principles of formation of the various (passive or active) propeller systems to realizing method of dynamic energy-saving superconductive propeller interaction with a fluid medium, which includes the following.

A propeller system for providing a process of dynamic energy-saving superconductive propeller interaction with a fluid medium comprises at least one propeller having at least two blades having at least two working blade surfaces each; at least one perforation on each from the working blade surfaces (at least on the front and back surfaces) having at least one perforation hole; and at least one blade energy optimizer having at least one control block connected with at least one modulator which structurally connected with at least two portions (inlet and outlet portions) of at least one created shunt passage having at least one communication with the perforation on each from the working blade surfaces of at least one blade.

In addition said modulator is configured for modulating a value of a connection providing by flowing the fluid medium between said perforations through the created shunt passage under an action of a difference (a sign or/and a value) of the pressures generating on each from the working blade surfaces (at least on the front and back surfaces) with the perforation relatively during the process of the interaction of the perforated blades of the rotating propeller with the fluid medium such that a dynamic structure-energetically optimization, in an energy-effective manner, of said modulated surface-energy interaction is provided.

Another important feature of the present invention is that the above-mentioned blade energy optimizer is provided for optimizing a value of at least one parameter of said modulating in dependence on a change of a value of at least one controlled characteristic influencing the dynamic surface-energy interaction efficiency, which comprises minimizing a boundary layer of the fluid medium on the working blade surfaces (at least on the front and back surfaces) with the perforation during the process of the modulated surface-energy interaction of the perforated blades of the rotating propeller with the fluid medium.

The above-mentioned is imported for all of the above-listed three groups of the propeller systems.

Also an important feature of the present invention is that in the above-mentioned the propeller system not having a propeller drive and structurally connected with a working mechanism said blade energy optimizer is provided for optimizing a value of at least one parameter of said modulating in dependence on a change of a value of at least one controlled characteristic influencing an energy efficiency of the working mechanism during the modulated surface-energy interaction of the perforated blades of the passive rotating propeller (at least the front and back surfaces) with a medium flow providing by a medium flow source, which structurally not connected with the propeller system. The above-mentioned is imported for the above-listed first group of the passive propeller systems.

At the same time an important feature of the present invention is that in the above-mentioned propeller system comprising at least one propeller drive and structurally connected with a mobile apparatus said blade energy optimizer is provided for optimizing a value of at least one parameter of said modulating in dependence on a change of a value of at least one controlled characteristic influencing a dynamic energy efficiency of a process of a movement of the mobile apparatus under an energy action of a modulated medium flow-draw, providing by the modulated surface-energy interaction of the perforated blades of the active rotating propeller (at least the front and back surfaces) with the fluid medium during said process. The above-mentioned is imported for the above-listed second group of the active rotating propeller systems.

Another important feature of the present invention is that in the above-mentioned propeller system comprising at least one propeller drive and structurally not connected with an object which energy interacting with a propeller medium flow said blade energy optimizer is provided for optimizing a value of at least one parameter of said modulating in dependence on a change of a value of at least one controlled characteristic influencing an energy efficiency of a process of medium flow transporting said object under an energy action of a modulated medium flow, providing by the modulated surface-energy interaction of the perforated blades of the active rotating propeller (at least the front and back surfaces) with the fluid medium during said process. The above-mentioned is imported for the above-listed third group of the active rotating propeller systems.

At the same time any from the above-mentioned propeller systems (for the above-listed three groups of the propeller systems) can comprise at least one additional modulator of said blade energy optimizer and at least one additional perforation on each from the perforated working blade surfaces (at least on the front and back surfaces). At that the additional modulator is structurally connected with at least one additional portion of at least one additional created shunt passage having at least one communication with the additional perforation on each from the perforated working blade surfaces (at least on the front and back surfaces) of at least one blade. At the same time said blade energy optimizer with the additional modulator is provided for additional optimizing a value of at least one parameter of additional modulating in dependence on a change of a value of at least one controlled characteristic influencing the dynamic surface-energy interaction efficiency, which comprises minimizing a boundary layer of the fluid medium on the working blade surfaces with the additional perforation during the process of the additional modulated surface-energy interaction of the perforated blades of the rotating propeller with the fluid medium.

The above-mentioned modulator of said blade energy optimizer is configured for providing at least one modulation parameter: a predetermined frequency, a predetermined range or a predetermined law of the modulating a value of a connection providing by flowing the fluid medium between said perforations through the created shunt passage under an action of a difference of the pressures generating on each from the working blade surfaces (at least on the front and back surfaces) with the perforation relatively during the process of the interaction of the perforated blades of the rotating propeller with the fluid medium. At the same time a predetermined "drop-shaped" form of a law of the modulating is preferable.

In addition the above-mentioned blade energy optimizer with at least one modulator can be configured for providing a predetermined comparative phase of the modulating a value of a perforated blade surfaces connection to a predetermined phase shift comparatively a comparative phase of an independent predetermined periodic process, which is dynamically connected with the process of the modulated surface-energy interaction of the rotating propeller perforated blade with the fluid medium. At the same time, if the propeller system comprises at least two propellers, the blade energy optimizer with at least one modulator in each propeller can be configured for providing a predetermined comparative phase of the modulating a value of a perforated blade surfaces connection in each propeller, relatively to a predetermined phase shift between the predetermined comparative phases of each said modulating dynamically connected with the process of the modulated surface-energy interaction of the perforated blades of the rotating propeller with the fluid medium in each said propeller.

The above-mentioned control block of said blade energy optimizer is configured for providing at least one modulation discrete input; at least one optimization parametric discrete input; and also—at least one optimization modulation discrete output that connected with at least one optimization modulation discrete input of said modulator.

And besides the above-mentioned connection between said blade perforations providing by flowing the fluid medium through the created shunt passage can comprises at least one filter.

At the same time the above-mentioned modulator of said blade energy optimizer comprises at least one valve block having at least one immovable valve element and at least one movable valve element connected with a drive; and the modulator is configured for providing said modulated connection through at least one passing channel of the immovable valve element and at least one passing channel of the movable valve element by a dynamic superposition of said passing channels during the process of the modulating a value of said connection providing by flowing the fluid medium between said perforations through the created shunt passage under the action of a difference of the pressures generating on each from the perforated working blade surfaces (at least on the front and back surfaces), relatively during the process of the interaction of the perforated blades of the rotating propeller with the fluid medium.

In addition the above-mentioned modulator is configured for providing a regime of a non-modulated connection of a predetermined value by a fixed superposition of said passing channels during the process of the interaction of the perforated blades of the rotating propeller with the fluid medium such that a fixed structure-energetically optimizing control, in an energy-effective manner, of said surface-energy interaction is provided.

At the same time any from the above-mentioned propeller systems (for the above-listed three groups of the propeller systems) comprises the perforation provided on the working blade surface by a realization of at least one perforation hole in a material of a body of the blade from outside of said working blade surface directly and having at least one communication with the created shunt passage.

In addition the above-mentioned perforation can be also provided on the working blade surface by a realization of at least one perforation hole in a material of a body from outside of at least one perforated constructive element additional fixed on the working blade surface (at least on the front and back surfaces) and having at least one communication with the created shunt passage.

Said perforation on the working blade surface can be without zones or has at least two zones of a given form and a given size, which are provided on a given part of the working blade surface.

If said perforation has at least two zones, the modulator of said blade energy optimizer is a multi-channel modulator comprising at least one controllable multi-channel zone commutator connected with said at least two zones of the perforation on a working blade surface by at least two portions (inlet and outlet portions) of created shunt passages having at least one communication with the perforation zone on each from the perforated working blade surfaces (at least on the front and back surfaces) of at least one propeller blade. Said controllable multi-channel zone commutator is configured for providing a symmetrical or a dissymmetrical regimes of at least two connections with multi-channel modulator of at least two zones of the perforations each on the different perforated working blade surfaces (at least on the front and back surfaces) of a propeller blade. At the same time the controllable multi-channel zone commutator is configured for providing a partial regime of at least one connection with multi-channel modulator of at least two zones of the perforations on the different perforated working blade surfaces of a propeller blade.

In addition, the above-mentioned modulator of said blade energy optimizer can be also configured for providing at least one outside pressure service input. Such input mean can be used to provide the possibility of connection of the modulator into an outside pressure source for the pressure fluid medium "expulsion" (cleaning) of all so-called "breathing" system of the perforated blade propeller system comprising, for example: the above-mentioned modulator passing channels of the movable and immovable valve elements; multi-channel zone commutator; inlet and outlet portions of created shunt passages; perforations or/and perforated constructive elements additional fixed on the working blade surfaces of the propeller system.

Thus, the above-mentioned new modulation principles of formation of the various (passive or active) propeller systems provide the realization of a process dynamic energy-saving superconductive propeller interaction with a fluid medium, further comprising providing a perforation having at least one perforation hole (forming so-called "breathing surface") on every from the working blade surfaces with the different pressures (at least on the front and back surfaces) of at least one propeller blade with an element possibility of at least one dynamic fluid medium flow connection between the perforated working blade surfaces with the different pressures; and modulating a value of the dynamic surface-energy interaction of the perforated working blade surfaces with the fluid medium by a given dynamic periodical change of a value of at least one parameter dynamically connected with a process of the dynamic fluid medium flow connection between the perforated working blade surfaces with the different pressures in dependence on a change of a value of at least one controlled characteristic influencing a dynamic energy efficiency of a propeller process such that a dynamic structure-energetically optimization, in an energy-effective manner, of said modulated surface-energy interaction is provided.

The novel features which are considered as characteristic for the present invention are set forth in particular in the appended claims. The invention itself, however, both as to its construction and new method of operation, together with additional objects and advantages thereof, will be best understood from the following description of specific embodiments when read in connection with the accompanying drawings.

DESCRIPTION OF THE PREFERRED EMBODIMENTS

A proposed new method of dynamic energy-saving superconductive propeller interaction with a fluid medium can be realized in the following manner.

Figure 1:
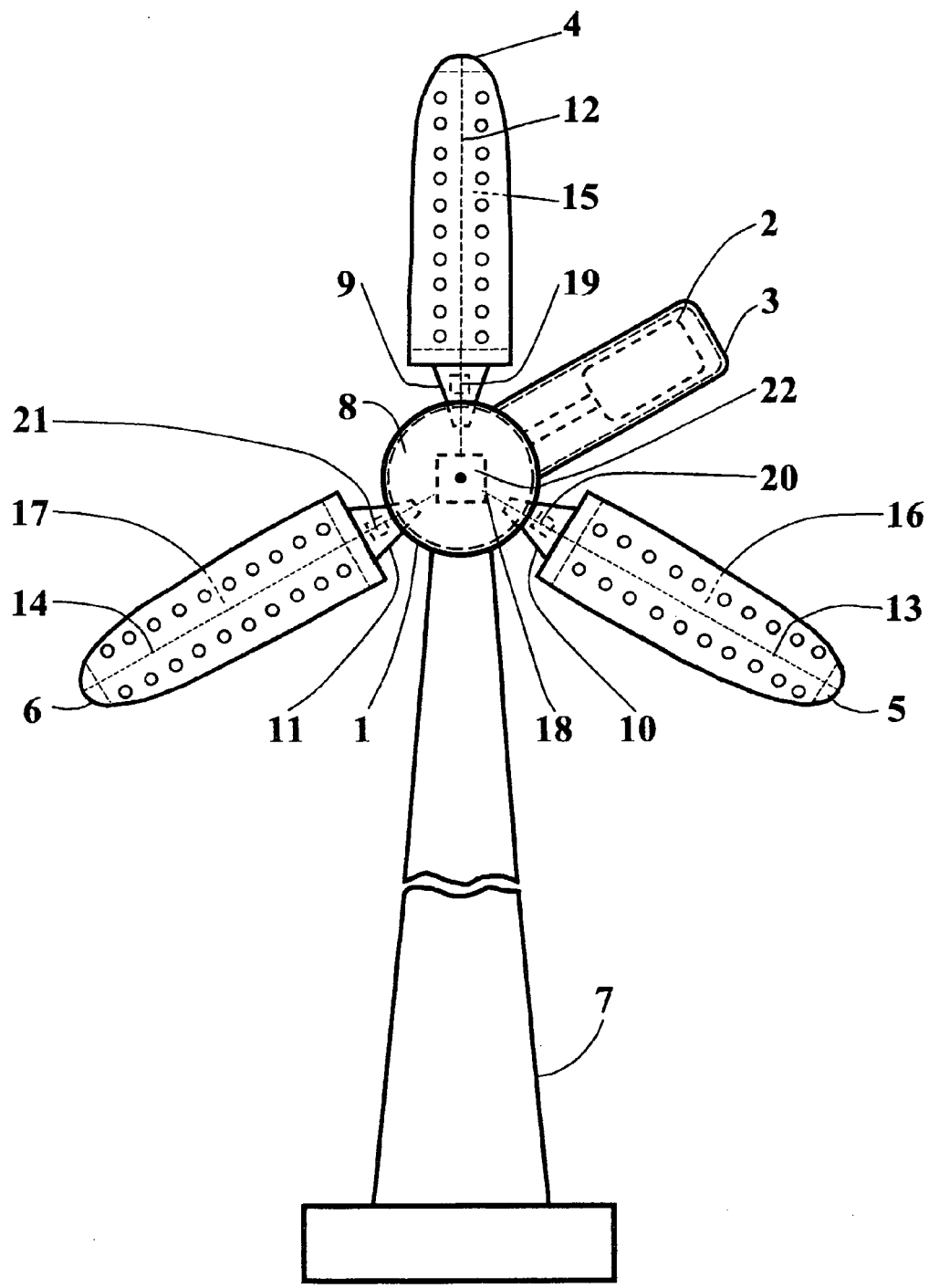
FIG. 1 is a view showing one of possible variants of a scheme of a functional structure of a wind propeller power generator with so-called "breathing surface" of the propeller blades, which provides realizing of a process dynamic (modulating) energy-saving superconductive propeller interaction with a fluid medium in accordance with the present invention.

One of the possible variants of a scheme of a functional structure of a wind propeller power generator with so-called "breathing surface" of the propeller blades, which provides realizing of a process dynamic (modulating) energy-saving superconductive propeller interaction with a fluid medium in accordance with the present invention is shown in FIG. 1. The showing energetically passive propeller system 1 not having a propeller drives and structurally connected with the working mechanisms—a power generator 2 having the constructive disposition into an immovable part of nacelle 3. In such propeller system the interaction of the identical passive rotating propeller blades (4, 5 and 6) with an air turbulent flow is provided by a wind (medium flow source), which structurally not connected with the energetically passive propeller system (it is the example of the first group of the above-mentioned functional classification of the traditional various propeller systems). The propeller system 1 is the constructive connection with a tower 7 and has a possibility for an electro-mechanical change of its angular position.

Figure 2:
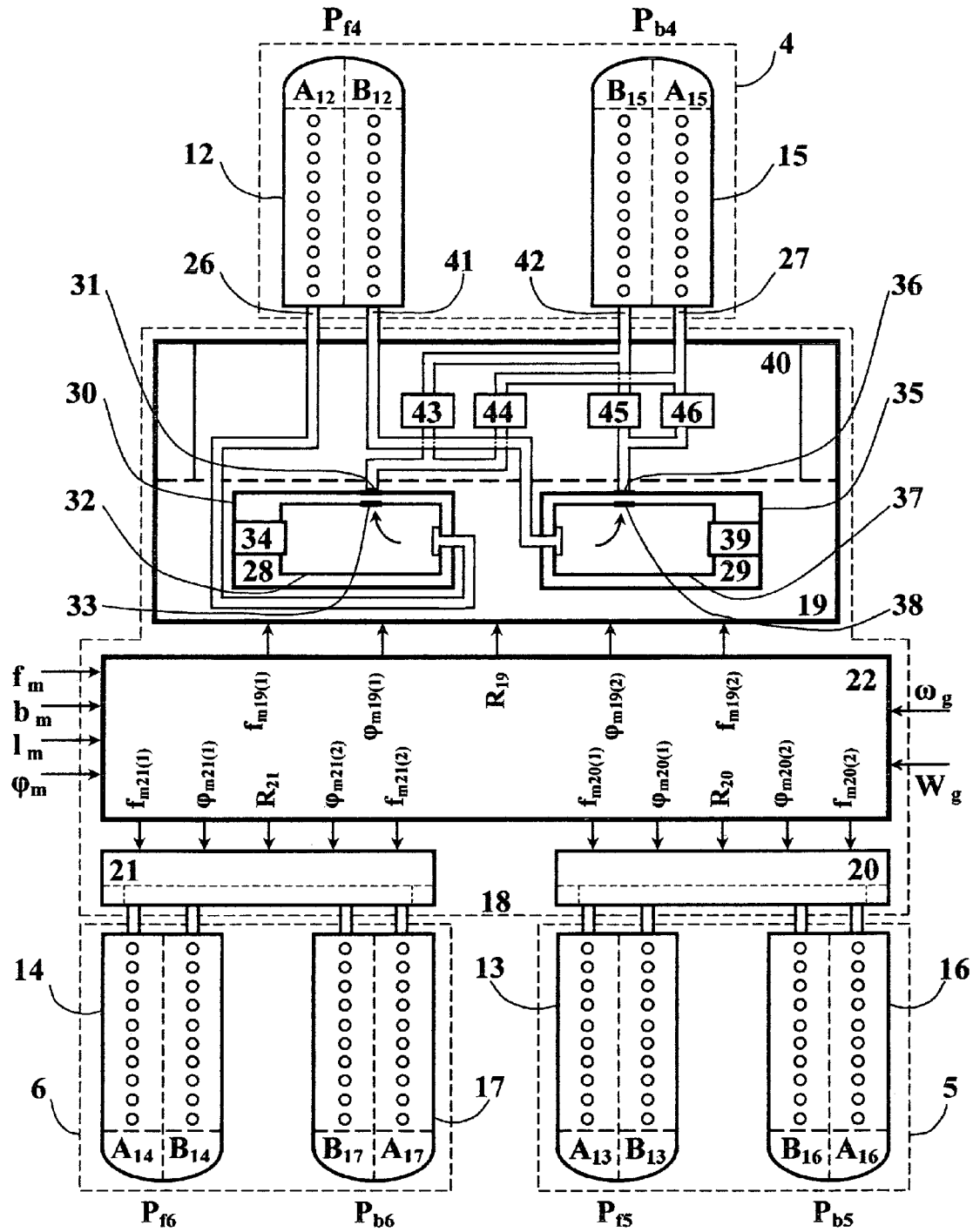
FIG. 2 is a view showing one of possible variants of a scheme of a functional structure of a connection of the two-zone perforations of the working blade so-called "breathing surfaces" of all propeller blades with the two-channel modulators of a blade energy optimizer in accordance with the present invention.

The propeller blades 4, 5 and 6 are mechanical connected with a movable part of nacelle 8 by the rotors 9, 10 and 11, relatively; and have the identical perforations (so-called "breathing surface") on two working blade surfaces each: the front surfaces —12, 13, 14; and the back surfaces —15, 16, 17; relatively. Each from said two working blade surfaces have two zones of said perforation ("A" and "B") or said perforations, relatively: A12-B12 and B15-A15; A13-B13 and B16-A16; A14-B14 and B17-A17; on working blade surfaces of said front surfaces —12, 13, 14; and said back surfaces —15, 16, 17; in accordance with the present invention is shown in FIGS. 1 and 2.

The propeller system 1 includes a blade energy optimizer 18 with three identical two-channel modulators 19, 20 and 21 are constructive built-in into a cavity of the rotors 9, 10 and 11, relatively. A microprocessor control block 22 of said blade energy optimizer 18 is constructive built-in into a cavity of the movable part of nacelle 8 and is control signals connected with said modulators 19, 20 and 21, relatively.

Figure 3:
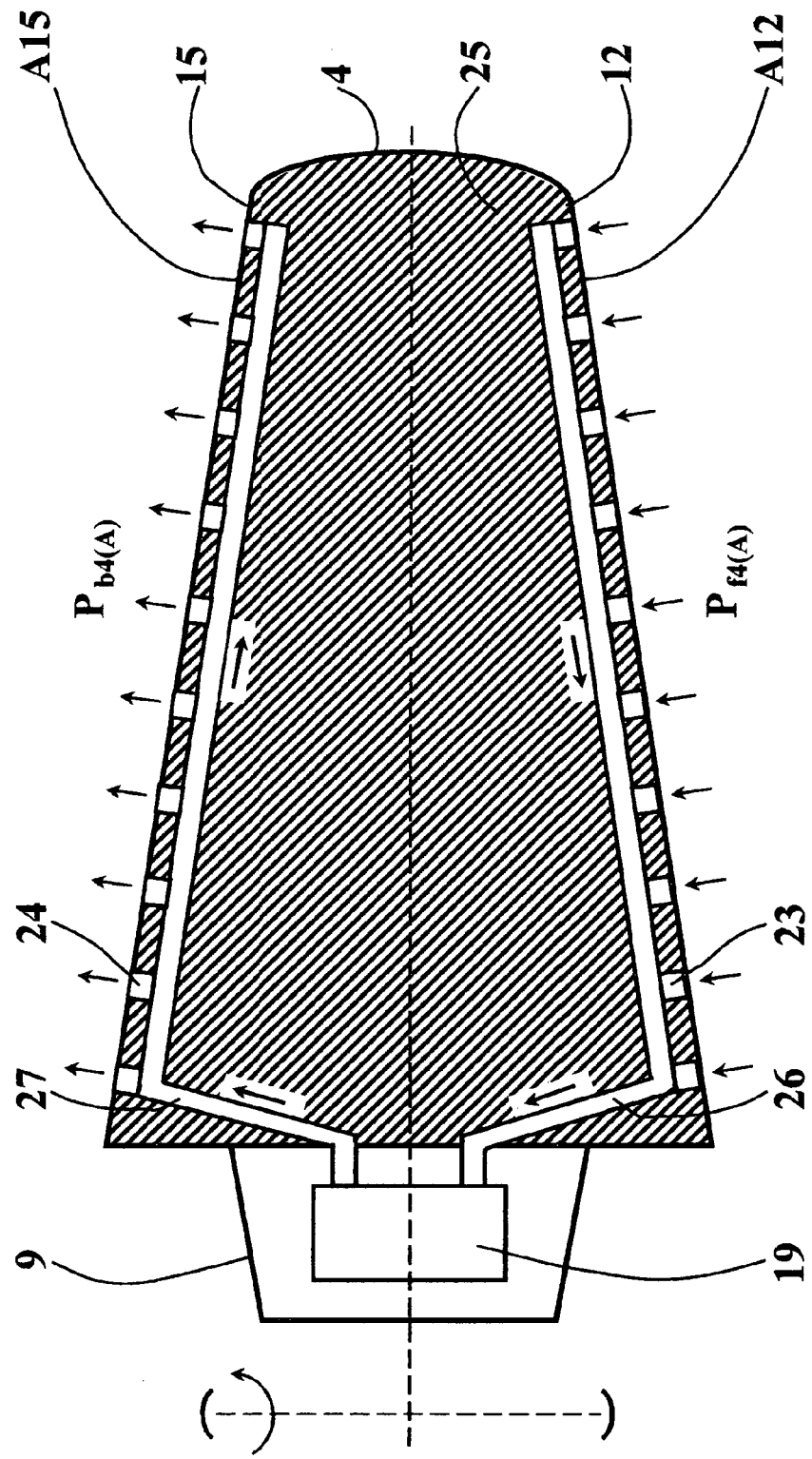
FIG. 3 is a view showing one of possible variants of a scheme of a functional structure of an one zone "A" of perforation on each from the working blade surfaces in a cross-section "A12-A15" of a propeller blade 4 with so-called "breathing surface", connected with a two-channel modulator of a blade energy optimizer in accordance with the present invention.

The above-mentioned perforations are provided by an identical realization of several holes in a material of a body of said blades 4, 5 and 6 from outside of the all front and back working blade surfaces 12-17 in accordance with the present invention. The example of functional structure of one zone "A" of perforation on each from the working blade surfaces 12 and 15 of the propeller blade 4 in a cross-section "A12-A15" is shown in FIG. 3. In said example the perforations are provided by the identical realization of several holes 23 and 24 in a material of a body 25 of said blades 4 from outside of the front working blade surface 12 (perforation zone A12) and from outside of the back working blade surfaces 15 (perforation zone A15), relatively. Said perforation holes 23 as and said perforation holes 24 are structurally connected with the two-channel modulator 19 by an inlet portion 26 and outlet portion 27 of created shunt passage which are structurally connected with the two-channel modulator 19.

For said example, the two-channel modulator 19 includes two identical valve blocks 28 and 29. Each from said valve blocks includes an immovable cylindrical valve element 30 and 35 with passing channel 31 and 36, relatively; a movable cylindrical valve element 32 and 37 with passing channel 33 and 38, relatively; and also—a stepping motor 34 and 39 of the movable valve element 32 and 37, relatively.

In addition the above-mentioned two-channel modulator 19 includes controllable two-channel zone commutator 40 connected with two zones of the perforation A12 and B12 on said front working blade surface 12 and also—connected with two zones of the perforation A15 and B15 on said back working blade surface 12 by portions 26, 27, 41, 42 of created shunt passages, relatively, as is shown in FIG. 2. The commutator 40 has several electro-magnetic valve blocks 43-46 and is configured for providing several regimes of the connections of said perforation zones with two identical valve blocks 28 and 29 of the two-channel modulator 19:

so-called "symmetrical" regimes: A12-A15 and B12-B15 (when the electro-magnetic valve blocks 43, 46 are closed, and blocks 44, 45 are opened);

so-called "dissymmetrical" regimes: A12-B15 and B12-A15 (when the electro-magnetic valve blocks 44, 45 are closed, and blocks 43, 46 are opened);

so-called "partial" regimes:
a) A12-A15 (when the electro-magnetic valve blocks 43, 45, 46 are closed, and block 44 is opened); or
b) B12-B15 (when the electro-magnetic valve blocks 43, 44, 46 are closed, and block 45 is opened); or
c) A12-B15 (when the electro-magnetic valve blocks 44, 45, 46 are closed, and block 43 is opened); or
d) B12-A15 (when the electro-magnetic valve blocks 43, 44, 45 are closed, and block 46 is opened); only.

In same example the microprocessor control block 22 of said blade energy optimizer 18 which is shown in FIG. 2, has four modulation discrete inputs for a microprocessor setting of the initial modulation parameters (a frequency $f_m$, a range $b_m$, a law of "drop-shaped" form $l_m$ and a comparative phase $\phi_m$ of the negative modulating a value of the surface-energy interaction of the rotating propeller blades with the fluid medium. In addition the control block 22 has two optimization parametric discrete inputs for an operating working information from the generator 2, which connected with the propeller system 1 (a signal $\omega_g$—from a sensor controls an in action value of an angular velocity of a generator rotation; and a signal $W_g$—from a different sensor controls an in action value of an active power of the generator 2). The control signal outputs of the microprocessor control block 22 connected with the optimization modulation discrete inputs of said modulators 19 (signals $f_{m19(1)}$, $f_{m19(2)}$, $\phi_{m19(1)}$, $\phi_{m19(2)}$ and $R_{19}$), 20 (signals $f_{m20(1)}$, $f_{m20(2)}$, $\phi_{m20(1)}$, $\phi_{m20(2)}$ and $R_{20}$) and 21 (signals $f_{m21(1)}$, $f_{m21(2)}$, $\phi_{m21(1)}$, $\phi_{m21(2)}$ and $R_{21}$), relatively.

The scheme of a functional structure of the two-channel modulators 20 and 21 with their functional structure connections with two zones of the perforations on said front and back working blade surfaces of the blades 5 and 6 (A13, B13, B16, A16; and A14, B14, B17, A17), relatively are completely analogical with the scheme of the above-mentioned functional structure of the two-channel modulator 19 with its functional structure connections with two zones of the perforations on said front and back working blade surfaces of the blade 4 and not are shown in FIG. 2.

The above-described variant of the scheme of the functional structure of the wind propeller power generator with so-called "breathing surface" of the propeller blades, which provides realizing of the process dynamic (negative modulating) energy-saving superconductive propeller interaction with the fluid medium in accordance with the present invention, operates in the following manner.

In the propeller system 1 the interaction of the identical passive rotating propeller blades (4, 5 and 6) with an air turbulent flow which is provided by a wind. The power generator 2 generating electricity from the kinetic power of the wind during the rotation of said propeller blades. For example, in a process of said interaction on each from the working blade surfaces 12 (front surface) and 15 (back surface) of the blade 4 with the perforation zones A12, B12 and A15, B15 generating a different (to atmosphere pressure $P_{atm}$) the pressures: a positive overpressure $P_{f4}$ and a negative overpressure $P_{b4}$, relatively.

When commutator 40 of the modulator 19 is configured (by a signal $R_{19}$ from the microprocessor control block 22) for providing the above-mentioned so-called "symmetrical" regime of the connections of said perforation zones: A12-A15 and B12-B15, with two identical valve blocks 28 and 29 by portions 26, 27, 41, 42 of created shunt passages, relatively, its electro-magnetic valve blocks 43, 46 are closed, and blocks 44, 45 are opened, as shown for example in FIG. 2.

Figure 4:
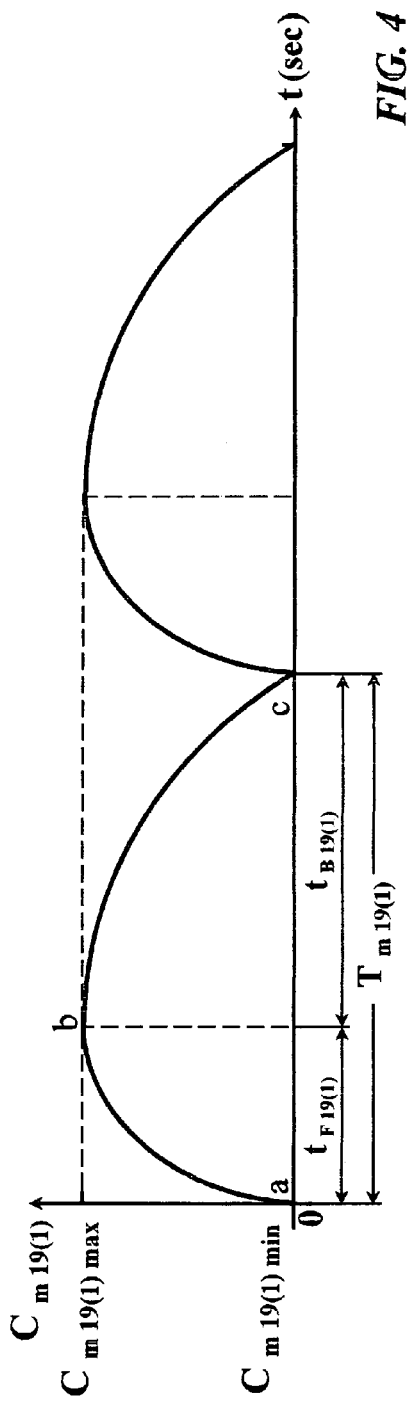
FIG. 4 is a view showing a diagram of an example of a predetermined "drop-shaped" form of a law of dynamic periodical change (by a modulator) of a value of a zone connection providing by flowing the fluid medium between the zone perforations of the working blade so-called "breathing surfaces" of a propeller blade through a created shunt passage under an action of a difference of the pressures generating on each from the working blade surfaces in accordance with the present invention.

For example, connection of said perforation zones A12-A15 with the modulator 19 by portions 26 and 27 of created shunt passage is shown in FIG. 3. Into said perforation holes 23 of perforation zone A12 as and into said perforation holes 24 of perforation zone A15 applying a difference of the pressures: a positive overpressure $P_{f4\,(A)}$ and a negative overpressure $P_{b4(A)}$, generating on each from the working blade surfaces 12 (front) and 15 (back) with the perforation, relatively during the process of the interaction of the rotating propeller blades with the fluid medium (the air turbulent flow which is provided by the wind). Said connection of the perforation zone A12 with the perforation zone A15 through the modulator 19 is provided by the passing channel 31 of the immovable valve element 30 and the passing channel 33 of the movable valve element 32 during their dynamic superposition over a rotation of the stepping motor 34 of the valve blocks 28 of the modulator 19. The connection providing by flowing the fluid medium (air flow) between said perforation zones A12 and A15 through the created shunt passage under an action of the difference of the pressures $P_{f4(A)}$ and $P_{b4(A)}$. During said dynamic superposition of the passing channel 31 and the passing channel 33 (over a rotation of the stepping motor 34) modulating a value of said dynamic fluid medium connection $C_{m19(1)}$ between the perforated working blade surfaces zones A12 and A15 with the different pressures $P_{f4(A)}$ and $P_{b4(A)}$ is provided. In said example, a predetermined range $b_m$ and a predetermined law of "drop-shaped" form $l_m$ of the modulating are constructive fixed provided by the sizes and forms of the passing channel 31 and the passing channel 33 of the valve block 28. At the same time the change of a value of said modulating connection $C_{m19(1)}$ from $C_{m19(1)min}$ (zero) to $C_{m19(1)max}$ on a front short part of "drop-shaped" form $l_m$ during a predetermined front time $t_{F19(1)}$ (see the diagram part "a-b") and the change of a value of said modulating connection $C_{m19(1)}$ from $C_{m19(1)max}$ to $C_{m19(1)min}$ (zero) on a back short part of "drop-shaped" form $l_m$ during a predetermined front time $t_{B19(1)}$ (see the diagram part "b-c") with a predetermined modulation period $T_{m19(1)}$ are provided, as shown for example in FIG. 4. The predetermined diagram part "a-b" is changed upon the form of a predetermined quarter ellipse curve such that a horizontal axis of said ellipse coincides with a horizontal axis of said "drop-shaped" form. The predetermined diagram part "b-c" is changed upon the form of a predetermined degree function curve such that an initial value of said degree, function curve coincides with an ending value of said quarter ellipse curve.

Figure 5:
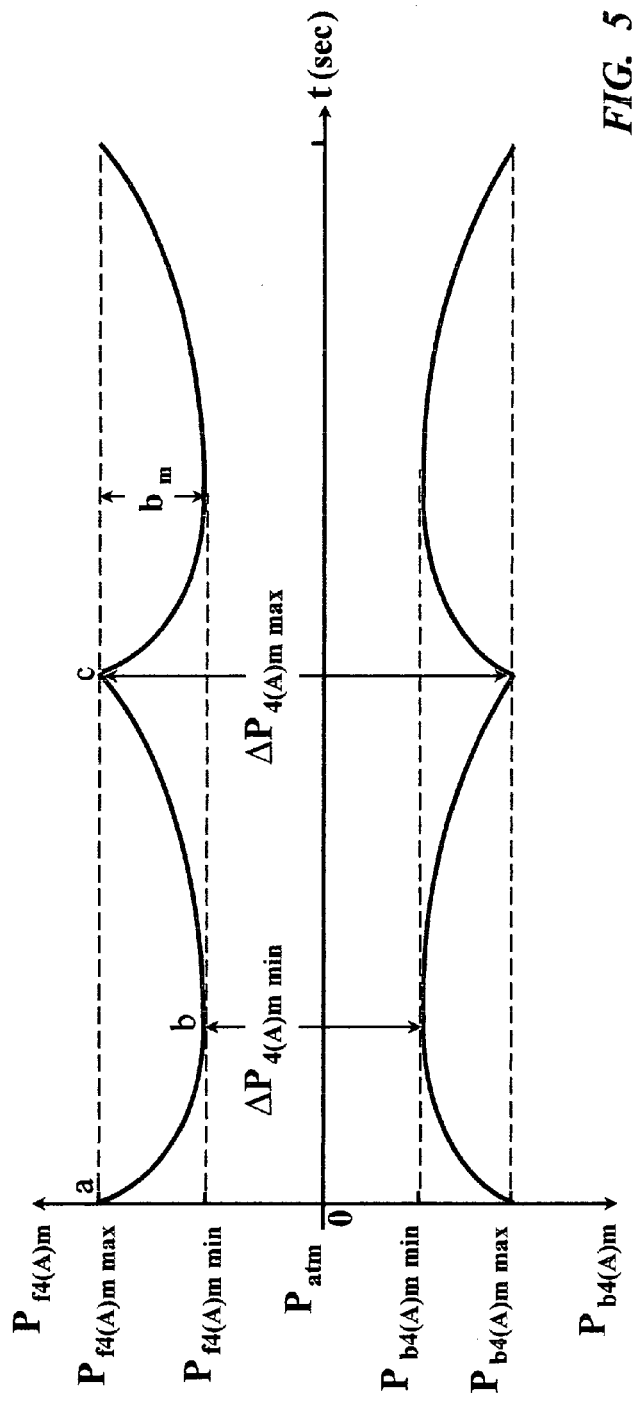
FIG. 5 is a view showing a diagram of an example of a predetermined "drop-shaped" form of a law of simultaneous dynamic periodical change (negative modulating) of a value of flow-forming positive overpressure in a power working zone on an outside working blade so-called "breathing surface" and a value of flow-forming negative overpressure in a suction working zone on a back working blade so-called "breathing surface" in accordance with the present invention.

The above-mentioned modulation of the connection $C_{m19(1)}$ provides of such modulation of the values of negative modulating pressures $P_{f4(A)m}$ and $P_{b4(A)m}$ in the predetermined range $b_m$: $P_{f4(A)m\ max}$–$P_{f4(A)m\ min}$ and $P_{b4(A)m\ max}$–$P_{b4(A)m\ min}$ relatively, as shown for example in FIG. 5. At the same time the change of a value of a difference of said modulating pressures $P_{f4(A)m}$ and $P_{b4(A)m}$ ($\Delta P_{4(A)m\ max}$ and $\Delta P_{4(A)m\ min}$) is provided. This situation occurs in each modulation period $T_{m19(1)}$ of the periodically repeating displacements of the movable cylindrical valve element 32 of the valve block 28 with a predetermined frequency $f_{m19(1)}=1/T_{m19(1)}$ and a predetermined comparative phase $\phi_{m19(1)}$ of the negative modulating said pressures $P_{f4(A)m}$ and $P_{b4(A)m}$. In addition said predetermined frequency $f_{m19(1)}$ and predetermined comparative phase $\phi_{m19(1)}$ are provided in the valve block 28 by a change of a velocity of rotation and a time step of the stepping motor 34, which are optimal adjusted by the microprocessor control block 22.

At the same time, during the negative modulation of the values of said pressures $P_{f4(A)m}$ and $P_{b4(A)m}$ through said perforation holes 23 of the perforation zone A12 as and through said perforation holes 24 of the perforation zone A15 the modulation pressure action on the boundary layers of the fluid medium on said perforated working surfaces, relatively are provided. The possible optimization of said modulation pressure action by an optimal adjusting with the microprocessor control block 22 the modulation parameters (for example the predetermined frequency $f_{m19(1)}$) will provide minimizing said boundary layers of the fluid medium on the said zone perforated working surfaces.

Analogically with the above-mentioned example of the process of the modulation of the surface-energy interaction of the perforated working zones A12 and A15 of the blade 4 with the fluid medium will realizes a process of the modulation of the surface-energy interaction of the perforated working zones B12 and B15 of the blade 4 with the fluid medium (providing the above-mentioned so-called "symmetrical" regime of the connections of said perforation zones: A12-A15 and B12-B15). In this process of the modulation will use the passing channel 36 of the immovable valve element 35 and the passing channel 38 of the movable valve element 37 with the stepping motor 39 of the valve blocks 29 of the modulator 19. In addition said predetermined frequency $f_{m19(2)}$ and predetermined comparative phase $\phi_{m19(2)}$ are provided in the valve block 29 by a change of a velocity of rotation and a time step of the stepping motor 39, which are optimal adjusted by the microprocessor control block 22 of said blade energy optimizer 18 (FIG. 2).

Analogically with the above-mentioned example of the process of the modulation of the surface-energy interaction the fluid medium with the perforated working zones of the blade 4 simultaneously will realize the "symmetrical" processes of the modulation of the surface-energy interaction the fluid medium with the perforated working zones: A13, A16; B13, B16 on the front and back perforated working surfaces 13 and 16 with a positive overpressure $P_{f5}$ and a negative overpressure $P_{b5}$, relatively on said working surfaces of the blade 5; and also—A14, A17; B14, B17 on the front and back perforated working surfaces 14 and 17 a positive overpressure $P_{f6}$ and a negative overpressure $P_{b6}$, relatively on said working surfaces of the blade 6. At the same time working the identical modulators 20, 21 and the identical (to the above-mentioned example) signals: $f_{m20(1)}$, $f_{m20(2)}$, $\phi_{m20(1)}$, $\phi_{m20(2)}$, $R_{20}$; and $f_{m21(1)}$, $\phi_{m21(1)}$, $\phi_{m21(2)}$, $R_{21}$; relatively. Thus will providing the minimize of said boundary layers of the fluid medium on all said zone perforated working surfaces of the blades 4, 5 and 6, simultaneously during the process of the modulated surface-energy interaction of the rotating propeller blades with the fluid medium such that a dynamic surface-energy interaction efficiency will be provided.

The microprocessor control block 22 analyzes a signal $\omega_g$ (from the sensor controls a in action value of the angular rotation velocity of the generator 2, proportional to the angular rotation velocity of the propeller 1); and also—a signal $W_g$ (from the different sensor controls a in action value of an active electricity power of the generator 2); and make energy optimization of all above-mentioned signals to all modulators 19, 20, 21 for given change of a value of at least one modulation parameter such that the dynamic structure-energetically optimization, in an energy-effective manner, said modulated surface-energy interaction is provided. Taking into consideration the above-mentioned initial modulation parameters: a frequency $f_m$, a range $b_m$, a law of "drop-shaped" form $l_m$ and a comparative phase $\phi_m$ of the negative modulating, the block 22 can change any modulation parameter (a signal $f_m$ or/and a signal $\phi_m$), and also—regime of the connections of said perforation blade zones with two identical valve blocks of the modulators (signals $R_{19}$, $R_{20}$, and $R_{21}$), relatively. And can be optimal realized any from the above-mentioned regimes of the connections of the perforated blade zones: so-called "symmetrical", "dissymmetrical" or "partial" regime by given change of the commutation (opened or closed) of the electro-magnetic valve blocks of the modulators.

In addition optimization can provide a predetermined comparative phase of the modulating for any regimes of the connections of the perforated blade zones:

to a predetermined phase shift comparatively a comparative phase of the different modulation process for the different connection of the perforated zones of the same blade (for example: $\Delta\phi_{m19}=\phi_{m19(1)}-\phi_{m19(2)}$);

to a predetermined phase shift comparatively a comparative phase of the different modulation process for the different connection of the perforated zones of the different blade (for example: $\Delta\phi_{m19(20)}=\phi_{m19(1)}-\phi_{m20(1)}$);

to a predetermined phase shift comparatively a comparative phase of a natural air turbulent flow action to the propeller system blades, which is provided by a wind.

In the above-mentioned "partial" regime of the non-modulated ($f_m=0$) connection of the perforated zones of the same blade any fixed value of said non-modulated connection can be fixed given by any fixed superposition of said passing channels of the modulator (from $b_{m\ min}=0$—non any fixed superposition of said passing channels, to $b_{m\ max}$—full fixed superposition of said passing channels). In this case fixed changing the connection of the perforated blade zones will provide the fixed change of surface-energy interaction of the connected perforated blade zones with the fluid medium. Such regime is provided by given time step of the stepping motor, which are optimal adjusted by the microprocessor control block 22 (for example, fixed signal $\phi_{m19(1)}$ over signal $f_{m19(1)}=0$) of said blade energy optimizer 18 (FIG. 2).

The above-mentioned multi-variant modulation regimes open qualitatively new possibilities for the dynamic structure-energetically optimization, in an energy-effective manner, the process of said surface-energy interaction of the rotating propeller perforated blades with the fluid medium (in such example—air flow). During the optimization process the microprocessor control block 22 of said blade energy optimizer 18 provides any said changes of the modulation parameters of said modulating and the regimes of connection of the perforated blade zones in dependence on a change of a value of at least one controlled energy characteristic ($\omega_g$ and $W_g$) of the generator 2 such that the maximal dynamic surface-energy interaction efficiency is provided. At the same time said maximal dynamic surface-energy interaction efficiency will characterize (for this example of the propeller system) a maximal value $W_{g\ max}$ and a maximal value $\omega_{g\ max}$ (proportional to the angular rotation velocity of the propeller 1)—the energy ratio of the generator 2 at the same an air turbulent flow action to the propeller system, which is provided by a wind.

The above-mentioned new features of said invention reflect a new "Principle of controlled interior dynamic shunting" of the front and back perforated working surfaces of the propeller blade with the different (front and back) pressures. In accordance with the important features of said invention, the above-mentioned method dynamic energy-saving superconductive propeller interaction with a fluid medium includes the optimization negative modulating a value of the dynamic surface-energy interaction of the perforated working blade surfaces with the fluid medium by a given dynamic periodical change of a value of at least one parameter dynamically connected with a process of the dynamic fluid medium connection between said front and back perforated working blade surfaces. At the same time the pressure actions on the boundary layers of the fluid medium on said perforated working blade surfaces will optimization modulating also with provide minimizing said modulated boundary layers during the process of the modulated surface-energy interaction of the rotating propeller blades with the fluid medium. The foregoing will provide increase the energy efficiency of said interaction and all propeller system (to decrease the drag shape and skin friction resistances, and also—increase horsepower to turn the propeller through the air for a given wind velocity action). The automatic control of the modulation parameters by said blade energy optimizer open qualitatively new possibilities for the dynamic optimizing said surface-energy interaction efficiency in the different such propeller systems.

The above-mentioned qualitatively new possibilities of the dynamic optimizing said energy interaction efficiency in the proposed method is conformed by the results of analytical researches of Dr. A. Relin and Dr. I. Marta in Remco International, Inc. (USA). Said researches show the high efficiency of the optimization actions on said boundary layers by the modulating "blowing"/"suction" wave effects in the turbulent medium flow on said front and back perforated working blade surfaces, which reduce the Reynolds shear stress. For the above-mentioned example said modulating "blowing"/"suction" wave effects providing by modulating the local flows through said perforation holes 24 and said perforation holes 23 of said perforation blade zones A15 and A12 of the blade 4, relatively, as is shown for example in FIG. 3. At that said modulating "blowing"/"suction" wave effects achieve the maximum by the dynamic optimizing said modulation parameters: $f_m$, $b_m$, $\phi_m$; and also—by optimizing said "drop-shaped" form of modulation law $l_m$.

The above-mentioned so-called "drop-shaped modulating law of Relin—Marta" $l_m$ (for above-mentioned example—in FIGS. 4 and 5) is being described by two expressions:

$$l_{m19(1)\ (a-b)} = \Delta P_{4(A)m\ max} - b_m \cdot [1-(1-t/t_{F19(1)})^2]^{1/2}, \text{ for } 0 \leq t \leq t_{F19(1)};$$

and $$l_{m19(1)(b-c)} = (\Delta P_{4(A)m\ max} - b_m) + b_m \cdot (t - t_{F19(1)})^\theta / (T_{m91(1)} - t_{F19(1)})^\theta, \text{ for } t_{F19(1)} \leq t \leq T_{m19(1)};$$

and where $\theta > 1$ (depends on $t_{F19(1)}$, $T_{m19(1)}$ and $b_m$).

The authors researches by using of the experimental results are confirmed, that their proposed the optimal "drop-shaped" form of modulating law $l_{m(opt)}$ is most energy efficient (in comparison with the another possible known forms of a modulating law, for example: sinusoidal, rectangular, triangular, trapezoidal, etc.) to bring the modulated medium flow-forming energy in a medium flow. Besides, the optimal "drop-shaped" modulating law $l_{m(opt)}$ (take into consideration its given naturally form) efficient joins all of the basic predetermined modulation parameters of said negative modulating of medium flow-forming energy between them. It is the basis of the first created mathematical modulation-hydrodynamical model for the computer search of optimal modulation parameters: $f_{m(opt)}$, $b_{m(opt)}$ and etc. (as it is first disclosed by Dr. A. Relin and Dr. I. Marta, for example in U.S. patent application Ser. No. 12/287,771—"Method of dynamic energy-saving superconductive transporting of medium flow", 2008).

Relaminarization of the boundary layers of medium flow is accompanied by suppression of turbulence in these air flow on the perforated blade zones by modulated pressure waves. The small scale vortexes generated by surface of boundary layer are destroyed to around it because of their instability and they to not penetrate in the external part of the flow. Increasing of the streamwise component of turbulent kinetic energy and formation of the ordered longitudinal orientated turbulent structures lead to decrease of the modulated turbulent viscosity and to the "pseodolaminarization" of the boundary layer. Such dynamic state of turbulence allows to flow in average to maintain the large scale turbulence structure and consequently in average to the optimization maximal increase of the kinetic energy of modulated medium flow—providing the physical phenomena—"superconductive" modulated medium flow, as it is first named by Dr. A. Relin, USA and disclosed for example in U.S. Pat. No. 6,827,528 (2004); and U.S. Pat. No. 7,556,455 (2009)—A. Relin. At the same time during the optimization process the microprocessor control block 22 of said blade energy optimizer 18 provides any said changes of the modulation parameters of said modulating and the regimes of connection of the perforated blade zones in dependence on a change of a value of at least one controlled energy characteristic ($\omega_g$ and $W_g$) of the generator 2 such that so-called "superconductive" energy-saving regime of the propeller blades interaction with a fluid medium (air) is provided.

The above-mentioned example illustrates the qualitatively new possibilities of the dynamic optimizing said energy interaction efficiency of the energetically passive propeller system relating to the above-listed first group of said propeller systems not having a propeller drive and structurally connected with the working mechanisms. In such propeller systems the interaction of the passive rotating propeller blades with a turbulent medium flow (naturally or artificially created) is provided by a medium flow source, which structurally not connected with the energetically passive propeller system for example, without any limitation: in different wind, gas or water propeller power generators (turbines); in different wind or water propeller mills, pumps or others working mechanisms; and also—in different special working mechanisms with the energetically passive propeller system. In such propeller systems said blade energy optimizer will use for optimizing a value of at least one parameter of said modulating in dependence on a change of a value of at least one controlled characteristic influencing an energy efficiency of the working mechanism (for example, without any limitation: angular rotation velocity and/or active power of the working mechanism) during the modulated surface-energy interaction of the perforated blades of passive rotating propeller with a medium flow. Thus, the above-mentioned new modulation principles of formation of the various passive propeller systems will provide realizing of the process dynamic energy-saving superconductive propeller interaction with a fluid medium. At the same time the energy efficiency of such energetically passive propeller systems with modulated so-called "breathing surface" of the propeller blades can be significantly (on tens percent) increase. Thus new modulation principles of the development of such propeller systems provide the following new dynamic possibilities:

increase the angular velocity of the energetically passive propeller;

automatic dynamic adjustment of a minimal value of the skin friction and drag shape resistances to different values of a velocity of turbulent medium flow (naturally or artificially created by a medium flow source); and decrease the energy losses by dynamic optimal control of flows around the propeller perforated blades under changeable the turbulent medium flow velocity.

Figure 6:
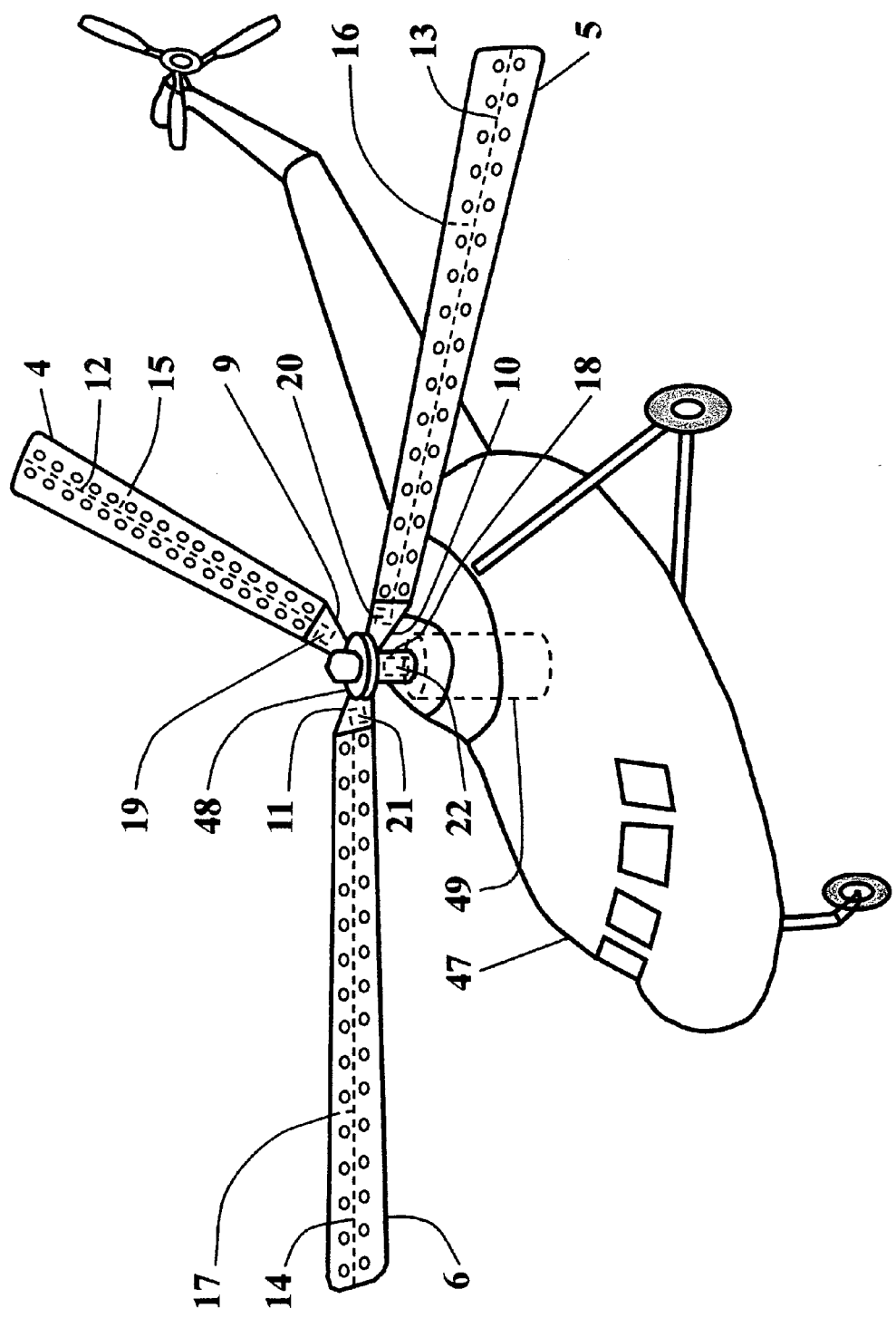
FIG. 6 is a view showing one of possible variants of a scheme of a propeller system structurally connected with the mobile apparatus (helicopter)

The above-mentioned new modulation principles can be also successfully used in the energetically active propeller systems (for example, propeller system 48, FIG. 6) comprising at least one propeller drive 49 and structurally connected with the mobile apparatus 47 (helicopter) to provide its movement for example, without any limitation: in aircraft, helicopter, dirigible, boat, ship, tanker, submarine or mobile apparatus on so-called "air pillow"; and also—in different underwater, air or ground special mobile apparatus, relating to the above-listed second group of the traditional propeller systems. In such energetically active propeller systems (relating to the above-listed second group of said propeller systems) the process of the movement of the mobile apparatus provide under an energy action of the turbulent medium flow-draw, which providing by the surface-energy interaction of the active rotating propeller blades with the fluid medium (for example: air or water). In this case the use of such perforated blade energy optimizer will provide the optimization of a value of at least one parameter of said modulating in dependence on a change of a value of at least one controlled characteristic influencing a dynamic energy efficiency of the process of movement of the mobile apparatus under an energy action of the modulated medium flow-draw (for example, without any limitation: a velocity of movement and/or an active energy consumption of the mobile apparatus).

And besides the above-mentioned difference of the pressures $\Delta P$ will generate on the front and back of the working surfaces of perforated blades of the active rotating propeller during the process of their surface-energy interaction with the fluid medium (a positive overpressure $P_f$—on the front, perforated working surface and a negative overpressure $P_b$—on the back perforated working surface, relatively). At the above-mentioned modulating the connection between said front and back perforated working surfaces (with given modulation parameters) the structure of active perforated working surface is modulated, that will provide the modulation of the flow-forming medium flow-draw from said front perforated working surface of the propeller.

And besides the use of the above-mentioned new modulation optimization principles can provide the new possibilities of the dynamic optimizing (as separately as will as simultaneously):

the energy action of the modulated medium flow-draw, which providing by the surface-energy interaction of the active rotating propeller perforated blades with the fluid medium (for example: air or water); and the surface-energy interaction of the perforated blades of said active rotating propeller with said fluid medium.

In such case the energetically active propeller system with so-called "breathing surface" of the propeller blades will comprise at least one additional modulator of said blade energy optimizer and at least one additional perforation on each from the perforated working blade surfaces. And besides the additional modulator must be structurally connected with at least one additional portion of at least one additional created shunt passage having at least one communication with the additional perforation on each from the perforated working blade surfaces of at least one blade. At the same time said perforated blade energy optimizer with said additional modulator will be provided for additional optimizing a value of at least one parameter of additional modulating in dependence on a change of a value of at least one controlled characteristic influencing the dynamic surface-energy interaction efficiency, which comprises minimizing the boundary layer of the fluid medium on the working perforated blade surfaces with the additional perforation during the process of the additional modulated surface-energy interaction of the rotating propeller perforated blades with the fluid medium.

At providing the modulation of the flow-forming medium flow-draw said mobile apparatus (for example, aircraft or submarine) will be dynamic moved with sign-alternating acceleration, that will provides the dynamic minimization of his aero- or hydrodynamic resistance during the process of optimization modulating the connection between said front and back perforated working blade surfaces of such propeller system (boundary layer will be destroyed in the surface zone of the apparatus body contacted with fluid medium, for example: air or water).

Thus new modulation principles of the development of such active propeller systems (relating to the above-listed second group of said propeller systems) with so-called "breathing surface" of the propeller blades which dynamic (with modulating) surface-energy interacting with air (for example, in the above-mentioned flying apparatus) provide the following new complex of dynamic possibilities:

automatic dynamic adjustment of a minimal value of the skin friction and drag shape resistances to different values of a velocity of naturally turbulent air flow; and decrease the energy losses by dynamic optimal control of flows around the propeller perforated blades under the changeable turbulent air flow velocity;

increase the angular velocity of the energetically active propeller in the air;

increase the velocity of movement of the apparatus in the air;

decrease (15%-20%) of the aerodynamic resistance of the body of apparatus by said modulation of thrust of the apparatus, the modulation of the air flow around the flying apparatus and control of the modulating wave action at the boundary layer on the all surface of the apparatus body;

decrease the energy consumption of apparatus drive (10%-15%) that lead to save of energy resources of the apparatus (15%-20%).

In addition, new modulation principles of the development of such active propeller systems with so-called "breathing surface" of the propeller blades which dynamic (with modulating) surface-energy interacting with water (for example, in the above-mentioned apparatus with the underwater propellers) provide the following complex of new analogical and additional specific dynamic possibilities:

increase the angular velocity of the energetically active propeller in the water;

increase the velocity of movement of the apparatus in the water;

decrease (15%-20%) of the hydrodynamic resistance of the body of apparatus by said modulation of thrust of the apparatus, the modulation of the water flow around the apparatus and control of the modulating wave action at the boundary layer on the all surface of the apparatus body in the water;

decrease the energy consumption of apparatus drive (10%-15%) that lead to save of energy resources of the apparatus (15%-20%);

significantly minimize (40%-50%) the destruction influence on the cavitations process on the blade working perforated surfaces of the apparatus underwater propeller that providing the significantly increase of the propeller life-time (by forming of the pressure "pillow" over these working perforated surfaces and significantly decrease of probability of formation of the destruction cavitations caverns on the working blade surfaces);

significantly minimize the possibility of the additional acoustic noises generating during the work of damaged by the cavitations surfaces of propeller blade (at the practical absence of the additional noises in the acoustic range).

Figure 7:
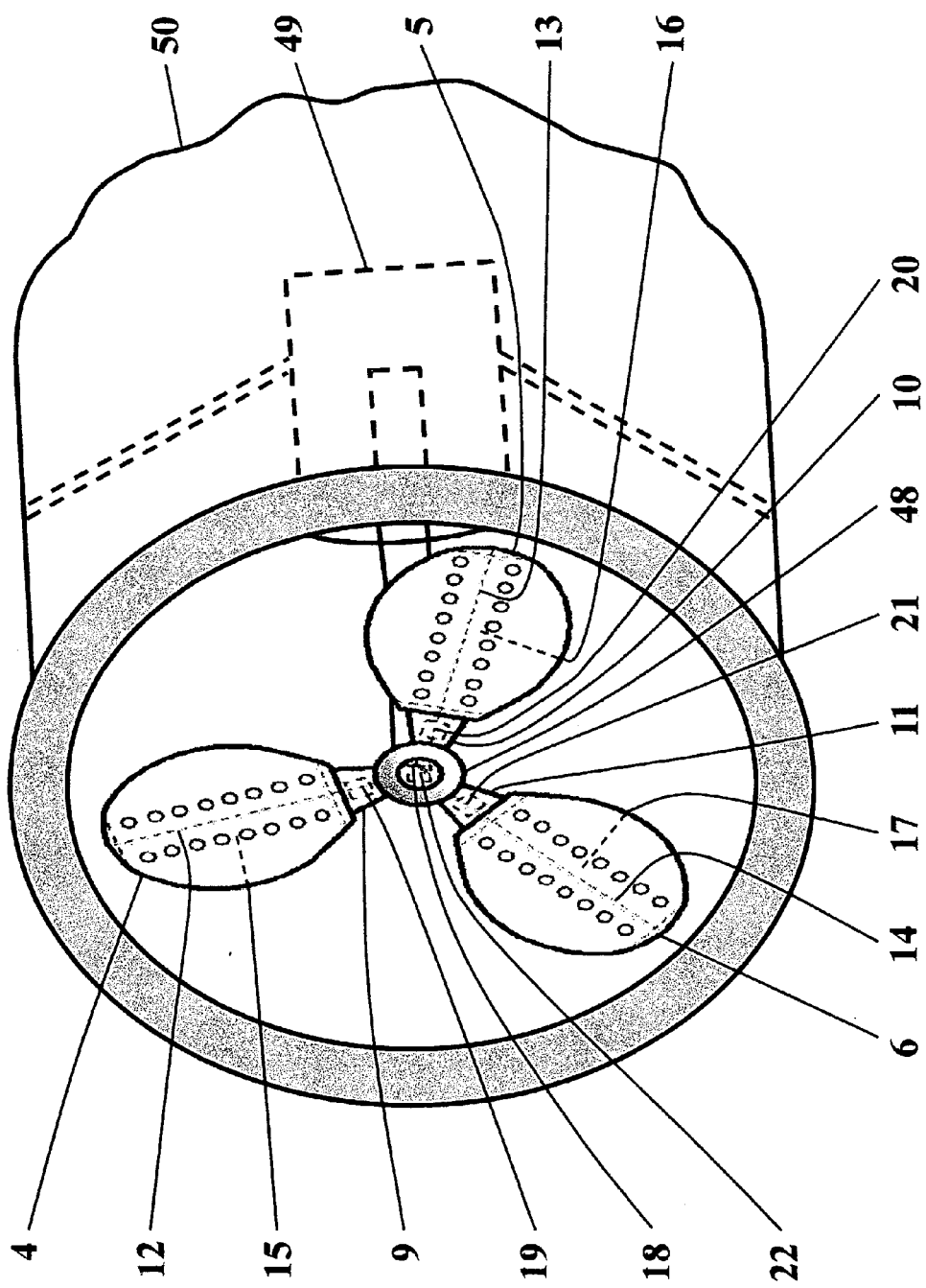
FIG. 7 is a view showing one of possible variants of a scheme of two propeller system structurally connected with the mobile apparatus (ship)

At the same time, if the above-mentioned active (air or water) propeller systems (for example, two propeller system 48, "A" and "B" respectively, each with the propeller drive 49, and structurally connected with the mobile apparatus 47 (ship), FIG. 7) of the above-listed second group comprise at least two propellers (for example: in aircraft or helicopter with the ganged propellers; and also—dirigible or ship with several diversity propellers), the blade energy optimizer with at least one modulator in each propeller can be configured for providing a predetermined comparative phase of the modulating a value of a perforated blade connection in each propeller, relatively to a predetermined phase shift $\Delta\phi_m$ between the predetermined comparative phases of each said modulating dynamically connected with the process of the modulated surface-energy interaction of the rotating propeller perforated blades with the fluid medium in each said propeller. New such modulating possibilities (in the summation, for example with the above-mentioned so-called "partial" regime of the connection of the perforated blade zones) allow dynamic optimize the complex multi-propeller energy process and provide the dynamic "thinner" control of the direction of movement of the mobility apparatus with the multi-propeller system (provide so-called "apparatus dynamic rudder" under an energy action of the multi-propeller modulated medium flow-draws).

Figure 8:
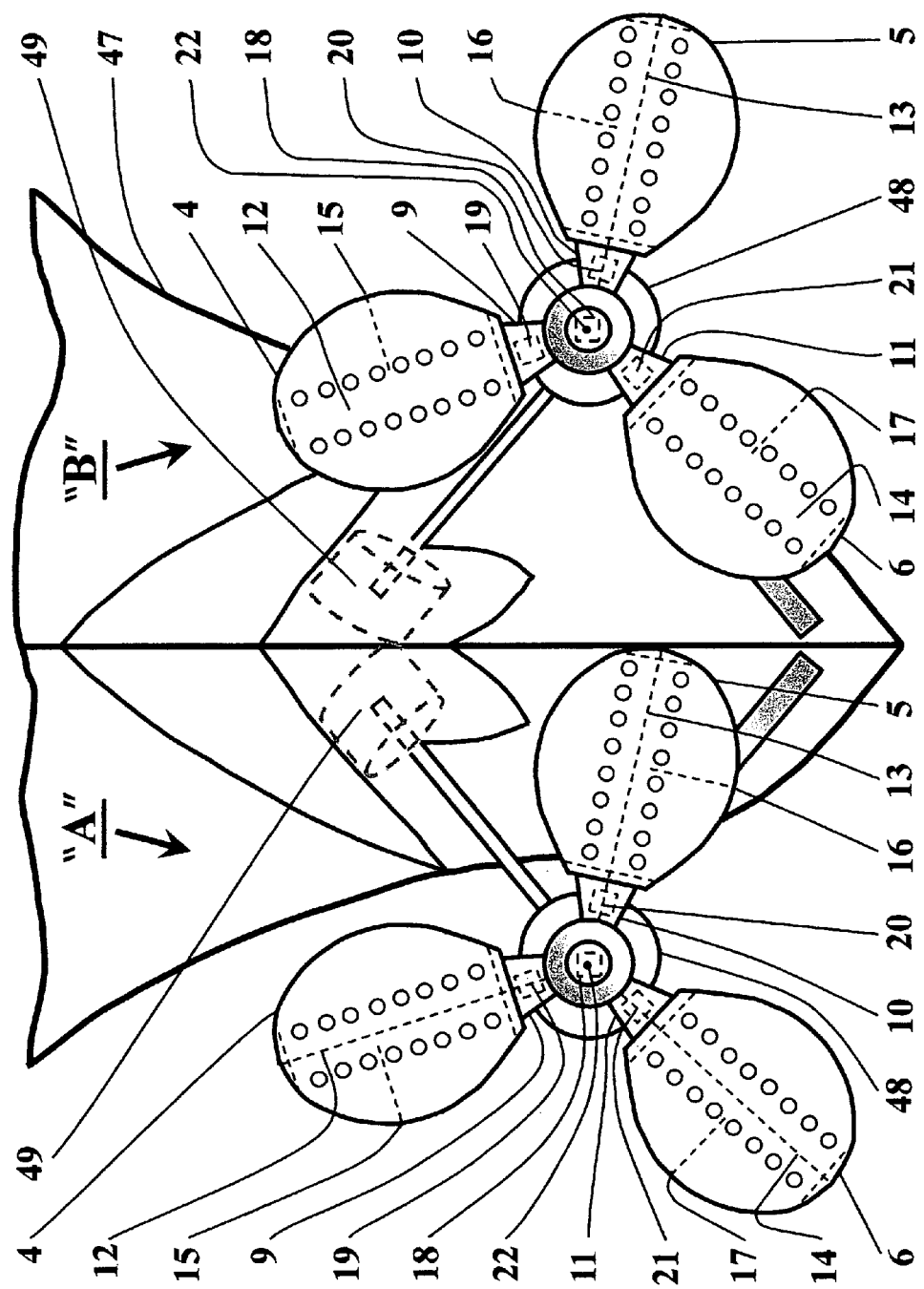
FIG. 8 is a view of a propeller system structurally not connected with an object (flow), which interacts with the propeller.

The above-mentioned new modulation principles can be also successfully used in the energetically active propeller systems (for example, propeller system 48, FIG. 8) comprising at least one propeller drive 49 and structurally not connected with an object (for example, without any limitation: at least one solid body, fluid medium or blend), which energy interacts with a propeller turbulent medium flow for example, without any limitation: in the different flow action venting, cleaning, airing or refrigerating systems; in the different flow action intermixing, concentrating, separating; and also—in the different object pipeline flow transporting (pipe 50), filtering or burning systems. In such energetically active propeller systems (relating to the above-listed third group of said propeller systems) the process of the movement of the object is provided under an energy action of the turbulent medium flow, which providing by the surface-energy interaction of the active rotating propeller blades with the fluid medium (for example: air, water or different blends). In this case the use of such perforated blade energy optimizer will provide the optimization of a value of at least one parameter of said modulating in dependence on a change of a value of at least one controlled characteristic influencing an energy efficiency of a process of medium flow transporting said object under an energy action of a propeller modulated medium flow (for example, without any limitation: an energy efficiency of the cleaning, airing, intermixing, concentrating, separating or refrigerating processes; and also—an energy efficiency of the object pipeline flow transporting, including control of a velocity of movement and/or an active energy consumption of this dynamic transportation process).

And besides the above-mentioned difference of the pressures $\Delta P$ will also generate on the front and back of the working surfaces of perforated blades of the active rotating propeller during the process of their surface-energy interaction with the fluid medium (a positive overpressure $P_f$—on the front perforated working surface and a negative overpressure $P_b$—on the back perforated working surface, relatively). At the above-mentioned modulating the connection between said front and back perforated working surfaces (with given modulation parameters) the structure of active perforated working surface is modulated, that will provide the modulation of the flow-forming medium flow-draw from said front perforated working surface of the propeller to said object flow transporting.

And besides the use of the above-mentioned new modulation optimization principles can also provide the new possibilities of the dynamic optimizing (as separately as will as simultaneously) in such energetically active propeller systems:

the flow-forming energy action to the flow transporting object, which providing by the surface-energy interaction of the active rotating propeller perforated blades with the fluid medium (for example: air, water or different blends); and the surface-energy interaction of the perforated blades of said active rotating propeller with said fluid medium.

In such case the energetically active propeller system with so-called "breathing surface" of the propeller blades will also comprise at least one additional modulator of said blade energy optimizer and at least one additional perforation on each from the perforated working blade surfaces. This additional modulator must be structurally connected with at least one additional portion of at least one additional created shunt passage having at least one communication with the additional perforation on each from the perforated working blade surfaces of at least one blade. At the same time said perforated blade energy optimizer with said additional modulator will be provided for additional optimizing a value of at least one parameter of additional modulating in dependence on a change of a value of at least one controlled characteristic influencing the efficiency of dynamic surface-energy interaction, which comprise minimizing the boundary layer of the fluid medium on the working perforated blade surfaces with the additional perforation during the process of the additional modulated surface-energy interaction of they rotating propeller perforated blades with the fluid medium.

At providing the modulation of the flow-forming energy action to the flow transporting object (for example: in the cleaning, airing, intermixing, concentrating, separating or refrigerating processes; and also—in the object pipeline flow transporting) said object will dynamic move with sign-alternating acceleration, that will provide the dynamic minimization of his aero- or hydrodynamic resistance during the process of optimization modulating the connection between said front and back perforated working blade surfaces of such propeller system (boundary layer will destroy in the surface zone of the object contiguous with fluid medium).

Thus new modulation principles of the development of such active propeller systems (relating to the above-listed third group of said propeller systems) with so-called "breathing surface" of the propeller blades which dynamic interact (with modulating) with fluid medium (propeller system with modulating flow action) provide the following new complex of dynamic possibilities:

decrease the energy losses by dynamic optimal control of flows around the propeller perforated blades under the changeable turbulent fluid medium flow velocity;

increase the angular velocity of the energetically active propeller in the fluid medium;

increase the velocity of movement of the object in the fluid medium;

automatic dynamic adjustment of a minimal value of the skin friction and drag shape resistances to different object flow transporting (15%-20%); and decrease the energy consumption of the propeller system drive (20%-25%);

significantly increase the energy and/or production efficiency of the process of medium flow transporting said object under the energy action of the propeller modulated medium flow (for example, without any limitation: in the cleaning, airing, intermixing, concentrating, separating or refrigerating processes; and also—in the object pipeline flow transporting processes).

At the same time, if the above-mentioned active propeller systems of the above-listed third group comprises at least two propellers (for example: in the separating or centrifugal propeller system), the blade energy optimizer with at least one modulator in each propeller can be configured for providing a predetermined comparative phase of the modulating a value of a perforated blade connection in each propeller, relatively to a predetermined phase shift $\Delta\phi_m$ between the predetermined comparative phases of each said modulating dynamically connected with the process of the modulated surface-energy interaction of the rotating propeller perforated blades with the fluid medium in each said propeller. New such modulating possibilities (in the summation, for example with the above-mentioned so-called "partial" regime of the connection of the perforated blade zones) allow dynamic optimize the complex multi-propeller energy process and provide the dynamic "thinner" control of the technological process (for example: separating or centrifugal) to its so-called "phase-vector" dynamic structural optimization.

The blade energy optimizer with the modulators can have different schematic, structural and functional solutions. For example, one of the possible so-called "hollow shell" variants of the functional construction of the valve blocks 28 and 29 of the modulator 19 is shown in FIG. 2 and can be the universal schematic solution for producing the blade energy optimizers for the different propeller applications with the perforated blades. General various variants of the construction of the modulating valve block and various algorithms of operation of the compact intellectualized energy-saving dynamic module are described in detail, for example in the above-mentioned our U.S. patents. At the same time it is necessary to note that the realization of the new method of dynamic energy-saving superconductive propeller interaction with a fluid medium in the various propeller applications with the perforated blades can relate with the need of specific changes in the operation of the microprocessor control block, valve block or/and sensors control of the technological parameters.

The above-mentioned microprocessor control block of the functional structure of energy-saving dynamic module (for example, as the block 22 of the microprocessor control block 18 in FIG. 2) can include:

the above-mentioned so-called "drop-shaped modulating aero- or hydrodynamical model of Relin—Marta", integrated in operation algorithm of this block for providing of universal parametric functionality by the possibility of the automatic correction of the computer estimated optimal modulation parameters at entry in the block of a new given parameters of the propeller interaction with a fluid medium in the various propeller application with the perforated blades, modulated medium flow, and also—controlled current optimization parameters;

the additional discrete inputs for setting of the new given parameters of the propeller perforated blades and/or modulated medium flow;

the additional optimization parametric inputs for setting of the new controlled current optimization parameters of the propeller application process;

the additional controlling outputs, which are connected for example, with the specifics channels of the multi-channel valve block or/and with the additional drive for movement of the control element (for example, ring) for needed complex correction of computer estimated optimal modulation parameters of the cylindrical valve elements of the valve block.

The microprocessor control block can realize various algorithms, of a single- and multi-parameter optimization control of the parameters of the modulation for providing a single- or multi parametric optimization of the process of dynamic energy-saving superconductive propeller interaction with a fluid medium in the various propeller applications with the perforated blades. For providing the special technological requirements can be used the optimization algorithm including the maintenance of the several given controlled parameters, simultaneously.

The additional controlling output, which are connected with the additional drive for movement of the above-mentioned control element (ring) can be connected, for example, with an electromagnetic drive providing the possibility of the given linear displacement or given angular displacement of the control element (ring) for needed complex correction of the above-mentioned computer estimated optimal modulation parameters (for example: $b_m$ and/or $l_m$) of cylindrical valve elements of the valve block.

The multi-channel valve block can include the longitudinal (coherent) disposition of several sectional cross-sections of the passing channels, which are formed (simultaneously, alternatively or selectively, for example by the movable control element) during the rotation of the movable cylindrical valve element relative to the immovable cylindrical valve element. Other of the possible variants of the functional construction of the multi-channel valve block of the modulator can include the parallel disposition of several above-mentioned "longitudinal" single- or multi-channel switch movable valve couples, including the movable and immovable cylindrical valve elements, and also—controlling drive, each. In some schematic solutions of the valve block the independent control element (ring) can be excluded. The functional role of this element can be carried out for example either by a structure of the immovable cylindrical valve element, which can be movable in the longitudinal and angular directions, or by a structure of the movable cylindrical valve element, which can be movable in the longitudinal direction (possibly with its drive). Herewith, said selective several sectional cross-sections of the passing channels of the multi-channel valve block can provide the different complex of the modulation parameters (for example: $l_m$, $b_m$, and $T_m$) for realization of the microprocessor-controlled optimization technological parameters.

The above-mentioned different additional functional and technical possibilities of the microprocessor control block and valve blocks of the modulator can provide the change of the value of time ratio (for example: $\alpha_{m19(1)}=t_{F19(1)}/T_{m19(1)}$—from more than 0 and less than 0.5) of the "drop-shaped" form of flow-forming energy modulation law $l_{m19(1)}$ (as an additional predetermined modulation parameter of said negative modulating) in dependence on a change of a value of at least one microprocessor-controlled optimization technological parameter. Such changes of said value of time ratio $\alpha_{m19(1)}$ during the realization of predetermined period $T_{m19(1)}$ of said "drop-shaped" form of said modulation law can include:

the technical changing a predetermined front time $t_{m19(1)}$ and providing a predetermined period $T_{m19(1)}$ of said negative modulating, simultaneously;

the technical changing a predetermined period $T_{m19(1)}$ of said negative modulating and providing a predetermined front time $t_{F19(1)}$, simultaneously;

the technical changing a predetermined front time $t_{F19(1)}$ and a predetermined period $T_{m19(1)}$ of said negative modulating, simultaneously.

The above-mentioned realization of the automatic control of predetermined phase (for example, $\phi_{m19(1)}$) of negative modulating of flow-forming energy actions can use and the different various technical solutions, for example:

the turn of the immovable cylindrical valve element of the valve block on given corner by the stepping motor;

the turn of the body of drive of movable cylindrical valve element on given corner by the stepping motor;

the turn of the movable cylindrical valve element on given corner by the stepping motor (or selsyn motor) which uses as its drive; etc. (are described in detail, for example in the above-mentioned our U.S. patent and patent pending materials).

The above-mentioned functional multi-channel or one-channel valve blocks of the modulator can be constructive integrated, for example: in the body of the blade, rotor or in the different constructive components of the propeller system. Said valve blocks can include the individual or general (group) motor. The rotation of the movable cylindrical valve elements can be organized from the rotation part of the propeller system (for example, from the rotation propeller billow). At the same time, the angular velocity of the rotation of the movable cylindrical valve elements is selected to provide the predetermined frequency (for example: $f_{m19(1)}=1/T_{m19(1)}$) of the negative modulating said pressures $P_{f4(A)m}$ and $P_{b4(A)m}$.

The selection of said frequency (in range: from infralow to high frequency) is connected with the estimated angular rotation velocity of the propeller blades for the above-mentioned different applications of the propeller systems.

At the same time, the above-mentioned system of the dynamic connection between said blade perforations of the propeller system providing by flowing the fluid medium through the created shunt passage and the valve blocks of the modulator can comprise at least one additional constructive element—filter, for the protection of said connection from the clog. In additional, the modulator can be configured for providing at least one outside pressure service input for the possibility of the continual or temporal (service) connection of the outside pressure source unto the above-mentioned system of the dynamic connection between said blade perforations. It will provide the possibility of the service or periodical working "expulsion" of said connection system.

The above-mentioned perforation on the working blade surfaces can have at least one zone of given form and given size, which are provided on given part of the working blade surface. Said perforated zones can be realized on the working blade surface for example, without any limitation:

along to the longitudinal axis of the working blade surface (at least two zones, having identical or not identical form and size of the holes)—symmetrical or dissymmetrical;

across to the longitudinal axis of the working blade surface (at least two zones, having identical or not identical form and size of the holes)—symmetrical or dissymmetrical;

mix (along and across) to the longitudinal axis of the working blade surface (at least two zones, having identical or not identical form and size of the holes)—symmetrical or dissymmetrical;

built-in in each other (at least two zones, having identical or not identical form and size of the holes)—symmetrical or dissymmetrical.

At the same time, said perforated zones can be perforate by the holes of the different sizes: from the large size ("rugged" perforation) to the over-small size (for example, without any limitation: at the laser inserting said holes—"laser" perforation). Said holes can have the different deeps, for example, without any limitation: from the several millimeters ("deep" perforation) to the several micrometers ("skin-deep" perforation). And besides, the total sectional area of all holes sectional areas of the perforation must be at least not less than an estimated maximal total sectional area of the valve passage (proportional to said $b_{m\ max}$) providing at the full superposition of the passing channel of movable valve element and the passing channel of immovable valve element of the modulation valve block connected with this perforation during the process of the modulating. Such requirement must be provided and to the total sectional area of all portions of at least one created shunt passage having at least one communication with this perforation, which is structurally connected with said modulator.

The above-mentioned perforation on the working blade surfaces can be realized in the material of blade body from outside of said working blade surface directly and can have at least one communication with at least one portion of created shunt passage. In addition said perforation can be realized in the material of body (from his outside) of at least one additional constructive element fixed on the working blade surface, which has at least one, communication with at least one portion of created shunt passage. Said body of the additional perforated constructive element (so-called "breathing surface") also can be realized with the use of the different materials for example, without any limitation: polymer, graphite, metal and different composite materials. Such perforated constructive element can have the different constructive fixes to the propeller blade for example, without any limitation:

fixed from outside in the special oriel on said blade by the chases (lateral or vertical) or/and by the screw;

fixed from outside in the special oriel on said blade by the special glue.

At the same time, said perforated constructive element can have in his structure at least one portion of created shunt passage for provide the possibility of his connection with other portions of created shunt passage of all structure of the "breathing surface" of propeller blade. Said portion of created shunt passage can be constructive created as the constructive clearance between said perforated constructive element with the through perforation and the "bottom" of said special oriel on said blade. Said "breathing surface" of propeller blade can be also created by the use of special technology (for example, plasma technology) of the multi-layer dusting.

The above-mentioned analysis of all examples of possible efficient use of the proposed new modulation principles of formation of the propeller—systems to realize the new method of dynamic energy-saving superconductive propeller interaction with the fluid medium persuasively illustrates the common most characteristic decisive and distinctive features of the present invention. In turn the above-mentioned advantages of the proposed inventive method open wide possibilities to create the principally new class of dynamic propeller system with the "breathing surface" of propeller blades, which realize the new additional function of the dynamic executive system for the modulation solution of the complex energy "thin" optimization of said dynamic energy-saving superconductive propeller interaction with the fluid medium. This reflects the possibility of the transition of the traditional propeller processes to the qualitatively new step of their development. This step of development will be characterized by the wide use of the dynamic energy-saving superconductive propeller interaction technologies, connected with the new above-mentioned dynamic propeller flow-forming energy actions, and also—with dynamic multi-parameter optimization control which uses the current control of dynamic technological characteristics of such processes in said propeller systems. Therefore, the potential entire market for the dynamic propeller system with the "breathing surface" of propeller blades may be estimated at multi-billion dollar level.

Therefore, this invention will form on the market in principle new class of the various modern intelligence dynamic energy-saving propeller products, which do not have analogs on the world market. In fact, this technology may become the standard for different industries in the twenty first century and will mark the new era of the technical evolution in the energy-saving propeller systems, based on the superconductivity propeller blades interaction with the fluid medium. As result of this conversion—tremendous saving of energy resources, new technological, exploitative, quality and price-forming possibilities for various applications on the multi-billion dollar market across the globe, can be achieved. In addition, this also determines the possibility of obtaining a multi-billion dollar economic effect connected with the solution of known general energy, humanitarian, ecological and social world problems.

It will be understood that each of the elements described above, or two or more together, may also find a useful application in other types of methods and devices differing from the types described above.

While the invention has been illustrated and described as embodied in the new method of dynamic energy-saving superconductive propeller interaction with a fluid medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claim:

1. A method of providing a dynamic energy-saving superconductive interaction of a rotating propeller with a fluid medium in a propeller system that interacts with an object to provide a process of its movement and has at least one rotating propeller with at least two blades each having at least two working blade surfaces each having at least one perforation that is structurally connected with at least one another perforation on the working blade surfaces of at least one blade to obtain at least one flowing connection of the perforations by flowing of the fluid medium between the perforations through at least one passage under an action of a difference of pressures generated on the working blade surfaces during an interaction of the at least one rotating propeller with the fluid medium, comprising the steps of:

modulating a value of the at least one flowing connection of the perforations to obtain a plurality of periods of the modulating each having maximum and minimum values of the at least one modulated flowing connection and to form modulated pressure waves in the at least one modulated flowing connection, providing modulated blowing/suction wave effects on a surface of a boundary layer adjacent to the working blade surfaces respectively during the interaction of the at least one rotating propeller with the fluid medium, the modulating including:

providing a frequency of the modulating of the at least one modulated flowing connection of the perforations to obtain a period of the modulating, providing a range of the modulating of the at least one modulated flowing connection of the perforations to obtain a change of the value of the at least one modulated flowing connection between maximum and minimum values in each of the periods of the modulating, providing a law of the modulating of the at least one modulated flowing connection of the perforations to obtain a form of the law of the change of the value of the at least one modulated flowing connection between maximum and minimum values during each of the periods of the modulating, providing a phase of the modulating of the at least one modulated flowing connection of the perforations to obtain a moment of time of a start of the modulating; and controlling a value of at least one characteristic influencing an energy efficiency of the process of the movement of the object interacting with the propeller system during the modulating of the at least one modulated flowing connection of the perforations;

optimizing a value of at least one parameter of the modulating selected from the group consisting of the frequency, the range, the law and the phase of the modulating of the at least one modulated flowing connection of the perforations in dependence on a change of the value of the at least one controlled characteristic influencing the energy efficiency of the process of the movement of the object so as to provide a dynamic optimization of the modulated blowing / suction wave effects on the surface of the boundary layer adjacent to the working blade surfaces respectively during the interaction of the at least one rotating propeller with the fluid medium and thereby to increase the energy efficiency of the process of the movement of the object, wherein said law of the modulating of the connection between the perforations on the working blade surfaces of the propeller produces a drop-shaped form of the change of the value of the connection between said maximum and minimum values during each of the periods of the modulating by:

increasing said value of said connection within the range of the modulating from said minimum value to said maximum value of the connection for creating a front part of said drop-shaped form by changing said front part to a form of a quarter ellipse curve such that a horizontal axis of an ellipse coincides with a horizontal axis of said drop-shaped form, and decreasing said value of said connection from said maximum value to said minimum value for creating a back part of said drop-shaped form by changing said back part to a form of a degree function curve such that an initial value of said degree function curve coincides with an ending value of said quarter ellipse curve, and providing a time for creating said front part of said drop-shaped form by selecting a time ratio of said time to the total time of one modulation of more than 0 and less than 0.5.

* * * * *